(12) United States Patent
Huttemann et al.

(10) Patent No.: US 9,193,282 B2
(45) Date of Patent: Nov. 24, 2015

(54) VEHICLE SEAT

(75) Inventors: Volker Huttemann, Remscheid (DE);
Silvio Harlaub, Pulheim (DE);
Velladurai Subramanian, Leverkusen (DE)

(73) Assignee: Johnson Controls Technology Company, Holland, MI (US)

( * ) Notice: Subject to any disclaimer, the term of this patent is extended or adjusted under 35 U.S.C. 154(b) by 1 day.

(21) Appl. No.: 13/811,862

(22) PCT Filed: Apr. 29, 2011

(86) PCT No.: PCT/EP2011/056823
§ 371 (c)(1),
(2), (4) Date: Apr. 25, 2013

(87) PCT Pub. No.: WO2012/013371
PCT Pub. Date: Feb. 2, 2012

(65) Prior Publication Data
US 2013/0200666 A1   Aug. 8, 2013

(30) Foreign Application Priority Data

Jul. 28, 2010  (DE) .......................... 10 2010 032 475
Jul. 28, 2010  (DE) .......................... 10 2010 032 479
Jul. 28, 2010  (DE) .......................... 10 2010 032 480
Jul. 28, 2010  (DE) .......................... 10 2010 032 481

(51) Int. Cl.
*B60N 2/427*  (2006.01)
*B60N 2/42*   (2006.01)
*B60N 2/02*   (2006.01)

(52) U.S. Cl.
CPC ................ *B60N 2/4228* (2013.01); *B60N 2/02* (2013.01); *B60N 2/42709* (2013.01); *B60N 2/42745* (2013.01)

(58) Field of Classification Search
CPC ............. B60N 2/42745; B60N 2/4228; B60N 2/4885; B60N 2/42709; B60N 2/433; B60N 2/02
USPC ...................................... 297/216.14
See application file for complete search history.

(56) References Cited

U.S. PATENT DOCUMENTS 7,766,424 B2    8/2010  Haglund
8,210,606 B2 *  7/2012  Meghira et al. ............ 297/216.1
2010/0176621 A1 * 7/2010  Aufrere et al. ............... 296/68.1

FOREIGN PATENT DOCUMENTS

CN    101641235 A     2/2010
DE    102005049302 A1  4/2007
(Continued)

OTHER PUBLICATIONS

International Search Report for application No. PCT/EP2011/056823 mailed Aug. 31, 2011.
(Continued)

*Primary Examiner* — Milton Nelson, Jr.
(74) *Attorney, Agent, or Firm* — Fletcher Yoder, P.C.

(57) ABSTRACT

The present invention relates to a vehicle seat having a seat part and a backrest, wherein the seat part and the backrest can be adjusted relative to one another by an adjustment mechanism, wherein a base plate which holds the adjustment mechanism is provided, wherein the base plate has at least two passage openings through which the base plate is connected to the seat part by fasteners, wherein one of the passage openings is in the form of an elongate hole.

6 Claims, 6 Drawing Sheets

(56) References Cited

FOREIGN PATENT DOCUMENTS

| | | |
|---|---|---|
| DE | 102005049303 A1 | 4/2007 |
| EP | 2179887 A1 | 4/2010 |
| EP | 2650167 A1 | 10/2013 |
| FR | 2917026 | 12/2008 |
| FR | 2943957 A1 | 10/2010 |
| JP | 2007210352 A | 8/2007 |
| JP | 2010500213 | 1/2010 |
| WO | 2008017794 A2 | 2/2008 |
| WO | 2009080973 A | 7/2009 |
| WO | 2012037218 A1 | 3/2012 |

OTHER PUBLICATIONS

European Search Report mailed Jun. 30, 2014. for Application No. 14167227,9.

Japanese Office Action mailed Sep. 2, 2014 for Application No. 201180032288.5.

Japanese Office Action mailed Jan. 28, 2014.

Chinese Office Action mailed Sep. 2, 2014 for Application No. 201180032288.5.

Chinese Office Action dated Apr. 27, 2015.

\* cited by examiner

VEHICLE SEAT

CROSS REFERENCE TO RELATED APPLICATIONS

This application claims priority from and the benefit of PCT Application No. PCT/EP2011/056823, filed on Apr. 29, 2011; German Patent No. DE 10 2010 032 475.2, filed on Jul. 28, 2010; German Patent No. DE 10 2010 032 479.5, filed on Jul. 28, 2010; German Patent No. DE 10 2010 032 481.7, filed on Jul. 28, 2010; and German Patent No. DE 10 2010 032 480.9, filed on Jul. 28, 2010; all entitled "Vehicle Seat", which are herein incorporated by reference.

BACKGROUND

The invention relates to a vehicle seat having a seat part and a backrest, as well as a vehicle having such a seat.

A vehicle seat generally comprises a backrest for supporting the back of a vehicle occupant sitting on the vehicle seat in the normal position. The backrest is able to be adjusted by means of an adjustment mechanism relative to the seat part of the vehicle seat into a position which is comfortable for the vehicle occupant. The backrest may also be provided with a head restraint which is arranged in a rigid or relatively pivotable manner with regard to the backrest.

Generally, the adjustment mechanism is arranged on a base plate which is fastened by means of a screw connection to the seat part. The base plate and the seat part in each case generally have at least two passage openings which are arranged adjacent to one another in an approximately horizontal plane and into which fastening means engage.

In the event of rear-end collisions in which a vehicle strikes against the rear of a vehicle which is stationary or moving slowly, the inertia of the vehicle occupants relative to the vehicle seat leads to acceleration of the vehicle occupants in the relevant vehicles, potentially resulting in severe injuries of the cervical spine (so-called whiplash injury) when there is no support of the head.

It is known from the prior art to provide head restraints which are intended, for example, to retain the head when it moves backwards. In this case, the resilience of the head restraint or the mounting thereof may result in said head restraint or the mounting thereof pivoting forward and then rearward. This rebound is undesirable.

SUMMARY

It is the object of the present invention to specify a vehicle seat having improved properties with regard to reducing the speed of impact to the rear of the head during a rear-end collision.

The object is achieved according to the invention by a vehicle seat having a seat part and a backrest, wherein the seat part and the backrest can be adjusted relative to one another by means of an adjustment mechanism, such that a base plate receiving the adjustment mechanism is provided with a slot which, in the event of an impact on the rear of the vehicle or the rear of a vehicle driving in front, due to the inertia of a vehicle occupant sitting on the vehicle seat, causes the backrest to be adjusted to a limited extent counter to the direction of the impact force acting on the vehicle, so that the acceleration of the vehicle occupant resulting from the rear impact is at least reduced.

In one possible embodiment, the slot is configured such that, in the event of an impact on a vehicle, in particular a rear impact, under the action of the force of the vehicle occupant, in particular the back region thereof, the backrest is adjusted to the rear to a limited extent counter to the direction of travel. The path of this adjustment is predetermined by the length of the slot. By means of an energy absorption element in the form of a deformable link plate, the impact energy produced during the impact of the vehicle occupant on the backrest is in this case at least partially absorbed.

In a further embodiment, a ramp-shaped drive element is provided, said drive element engaging in the deformable link plate and contributing to the at least partial absorption of the impact energy produced during the impact of the vehicle occupant.

In a further embodiment, two link plates which are able to deform, in particular able to buckle, may be provided, said link plates at least partially absorbing the impact energy produced in the event of an impact of the vehicle occupant on the backrest, so that the speed of impact to the rear of the head may be reduced.

In a further embodiment, the deformable link plate at a first end is fastened to the seat part by means of the front fastening means together with the passage opening of the base plate configured as a slot, wherein a second end of the link plate is aligned in an approximately vertical direction and is connected to the seat part, so that the impact energy produced in the event of an impact of the vehicle occupant on the backrest is at least partially absorbed by expansion of the link plate.

The base plate may also be configured such that tolerances are compensated to a greater extent in an approximately horizontal plane than in the vertical plane. In this case, the screw connection in each case has at least two passage openings in the base plate and in the seat part, said passage openings being configured such that tolerances are compensated to a greater extent in the approximately horizontal plane than in the vertical plane.

To this end, at least one first passage opening in the base plate or in the seat part is configured as a horizontally-extending slot, the vertical extent thereof, i.e. the height thereof, corresponding to the diameter of the fastening means, and being only slightly larger than the diameter thereof. The second passage opening of circular configuration has a diameter which corresponds to the diameter of the fastening means and is only slightly larger than the diameter thereof.

The compensation of tolerances, in particular component tolerances, is in this case predetermined by the length of the slot in the base plate or the seat part. The height of the slot and thus the extent thereof in the vertical direction in this case corresponds substantially to the predetermined nominal size of the fastening means engaging therein. By the implementation of such a slot with a greater compensation of tolerances in the horizontal plane than in the vertical plane, undesirable rotation of the backrest about the pivot axis is substantially avoided. Moreover, in the event of a rear impact, the backrest is rotated as little as possible.

In this manner, a particularly rigid design of the connection of the backrest and the seat part is achieved.

DRAWINGS

Exemplary embodiments of the invention are described in more detail hereinafter with reference to the drawings, in which:

FIG. 1 shows schematically an enlarged detail of a vehicle seat in the region of an adjustment mechanism and a fastening of the adjustment mechanism, FIG. 2 shows schematically the vehicle seat according to FIG. 1 with a link plate arranged in the region of the adjustment mechanism, FIG. 3 shows schematically a sectional view of the adjustment mechanism with the link plate according to FIG. 2 along the line III, FIG. 4 shows schematically a sectional view of the adjustment mechanism according to FIG. 2 along the line IV, FIG. 5 shows schematically a sectional view of a second embodiment of the adjustment mechanism with the link plate according to FIG. 2 along the line III, FIG. 6 shows schematically a sectional view of the second embodiment of the adjustment mechanism according to FIG. 2 along the line IV, FIG. 7 shows schematically the vehicle seat according to FIG. 1 with a third embodiment of the adjustment mechanism with two link plates arranged in the region of the adjustment mechanism, FIG. 8 shows schematically a sectional view of the third embodiment of the adjustment mechanism with two link plates according to FIG. 7 along the line III, FIG. 9 shows schematically a vehicle seat with a fourth embodiment of an adjustment mechanism and a fastening for said adjustment mechanism, FIG. 10 shows schematically an enlarged detail of the vehicle seat according to FIG. 9 in the region of the fastening with a slot for compensating for component tolerances, FIG. 11 shows a perspective view of an enlarged detail of the vehicle seat with a fifth embodiment of the adjustment mechanism, FIG. 12 shows a perspective view of a base plate of the adjustment mechanism according to the fifth embodiment.

DETAILED DESCRIPTION

Parts which correspond to one another are provided in all the figures with the same reference numerals.

FIG. 1 shows schematically in a side view an enlarged detail of a vehicle seat 1 comprising a seat part 2 and a backrest 3, which on the front side has a support surface for the back of a vehicle occupant. The detail shows the vehicle seat 1 in the region of an adjustment mechanism 4 which permits a pivoting movement of the backrest 3 relative to the seat part 2.

In a manner not shown in more detail, the backrest 3 may also be provided with a headrest which is arranged in a rigid or relatively pivotable manner with regard to the backrest 3.

The seat part 2 and the backrest 3 are able to be adjusted relative to one another by means of the adjustment mechanism 4 which may be blocked. The adjustment mechanism 4 comprises at least one torsion spring D which in the region of a pivot axis A of the backrest 3, on the one hand, acts thereon and, on the other hand, acts on the seat part 2, whereby the backrest 3 is arranged pretensioned in a predeterminable position and may be blocked in said position, so that a defined support surface is created for the back of a vehicle occupant.

During normal operation, the seat part 2 and the backrest 3 are rigidly coupled together. By releasing the blocking, the backrest 3 may be positioned counter to, or by the spring force of the torsion spring D be positioned into, a position which is comfortable for the vehicle occupant sitting on the vehicle seat 1 and may be blocked in this position. For example, a conventional handwheel, not shown in more detail, may be provided for adjusting the backrest 3. By means of the blocking, the backrest 3 is prevented from being tilted to the front or rear during normal operation.

The adjustment mechanism 4 comprises a base plate 5 to which the torsion spring D is fastened. The base plate 5 is fastened by means of at least one pair of fastening means 6 and 7, for example screws, to the seat part 2 (shown in FIG. 2).

In this case, the base plate 5 comprises a slot 8 which permits a rotation of the backrest 3 caused by a rear impact. The slot 8 in this case forms the through-bore for receiving a fastening means 6, in particular a front fastening means viewed in the direction of travel. The slot 8 is designed to be linear and extends perpendicular to the direction of travel from top to bottom.

Alternatively, the slot 8 may be designed to be arcuate, in particular as a circular segment. The front fastening means 6 is inserted into the slot 8 and fastened there such that it strikes against one of the stop ends 9.1, 9.2, in particular the rear upper stop end 9.1 of the slot 8 viewed in the direction of travel.

In the event of an impact to the rear of the vehicle, as a result of the inertia of a vehicle occupant sitting on the vehicle seat 1, the slot 8 permits the backrest 3 to be adjusted to a limited extent in the direction of the arrow R counter to the direction of the impact force acting on the vehicle. In this case, the adjustment movement is established by the length of the slot 8. With an arcuate slot, the pivoting movement substantially corresponds to the angle of rotation of the arcuate slot.

In the event of a rear impact, the front fastening means 6 strikes against the front lower stop end 9.2 of the slot 8, so that the movement of the backrest 3 is limited.

By such a limited adjustment movement of the backrest 3 in the direction of the arrow R, counter to the direction of the impact force acting on the vehicle, a defined adjustment of the backrest 3 is permitted, at least one portion of the energy caused by the rear impact being able to be absorbed in the path thereof.

To this end, a link plate 10 is provided as an energy absorption element. FIG. 2 shows the adjustment mechanism 4 according to FIG. 1 with such a link plate 10. The link plate 10 connects the two fastening means 6 and 7.

In the event of an impact, the link plate 10 serves for the plastic deformation and thus for energy absorption. By absorbing the energy produced during the impact, by plastic deformation, the speed of impact to the rear of the head may also be reduced.

To this end, the base plate 5 is provided with a drive element 11. The base plate 5 and the drive element 11 may also be configured as a molded part.

The drive element 11 is centrally arranged on the lower face of the base plate 5. The drive element 11 comprises a ramp F which forms an oblique plane. The ramp F of the drive element 11 is formed at a predetermined angle relative to the plate plane of the base plate 5. For example, the ramp F is arranged at an angle of 45°.

In the case of a rear impact and due to the resulting limited movement of the base plate 5 with the drive element 11 comprising the ramp F along the slot 8, the ramp F of the drive element 11 presses against the link plate 10 and entrains said link plate upward or vertically relative to the plate plane of the base plate 5 such that the link plate 10 is plastically deformed, in particular bent.

A whiplash injury may be counteracted by such an absorption of the energy produced during the impact, as a result of plastic deformation during a defined adjustment movement and a reduction of the speed of impact to the rear of the head.

The second embodiment coincides in the majority of features with the embodiment shown in FIGS. 1 to 4.

Deviating therefrom, in the second embodiment the drive element 11 protrudes from the base plate 5 as a tab-like extension, wherein the extension is angled-back at a predetermined angle from the plate plane of the base plate 5.

In the case of a rear impact and due to the resulting limited movement of the base plate 5 with the drive element 11 along the slot 8, the drive element 11 presses against the link plate 10 and entrains said link plate along the plate plane of the base plate 5 such that the link plate 10 is plastically deformed, in particular bent.

Figure 1:
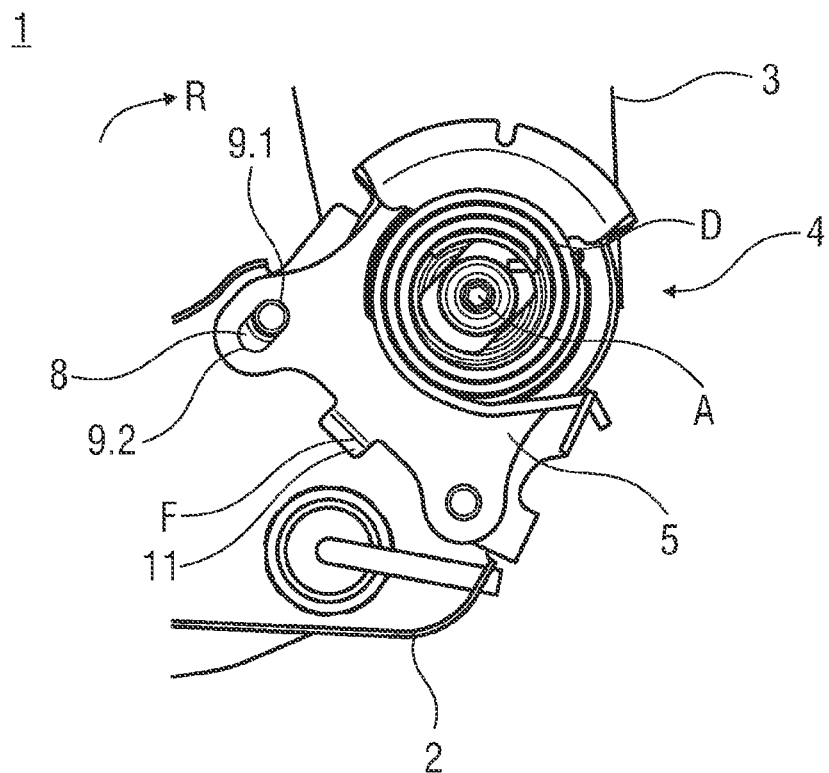
Figure 2:
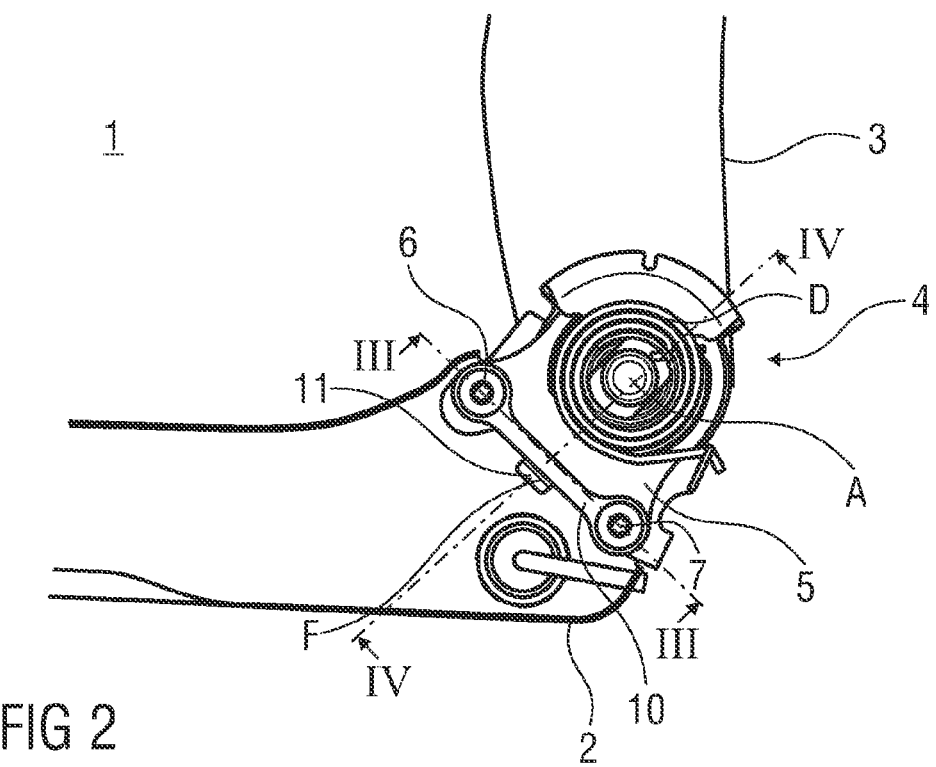
Figure 3:
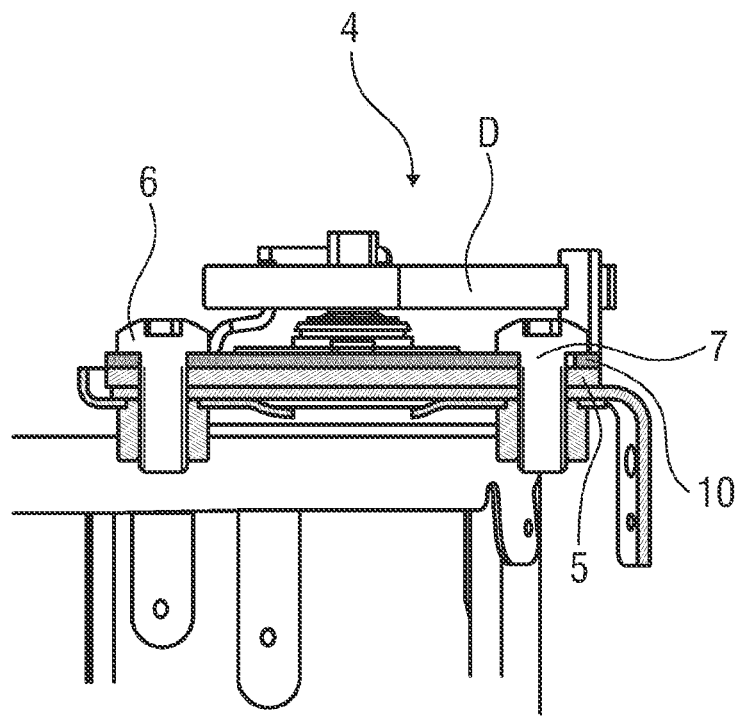
FIG. 3 shows schematically a sectional view of the adjustment mechanism 4 according to FIG. 2 along the line III.
Figure 4:
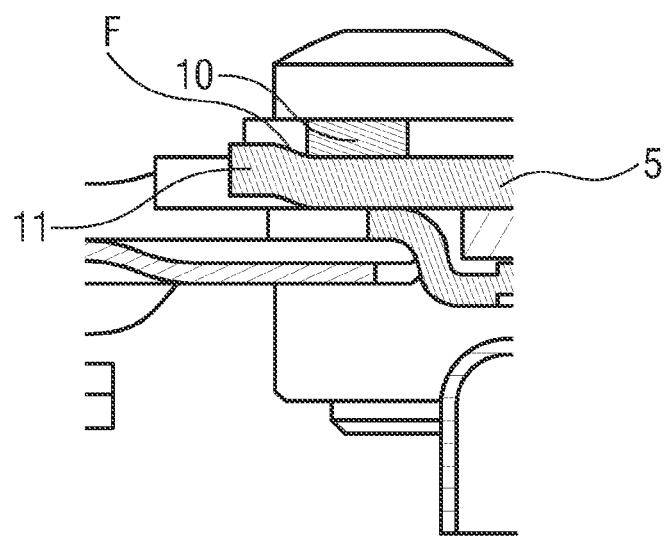
FIG. 4 shows schematically a sectional view of the adjustment mechanism 4 according to FIG. 2 along the line IV.
Figure 5:
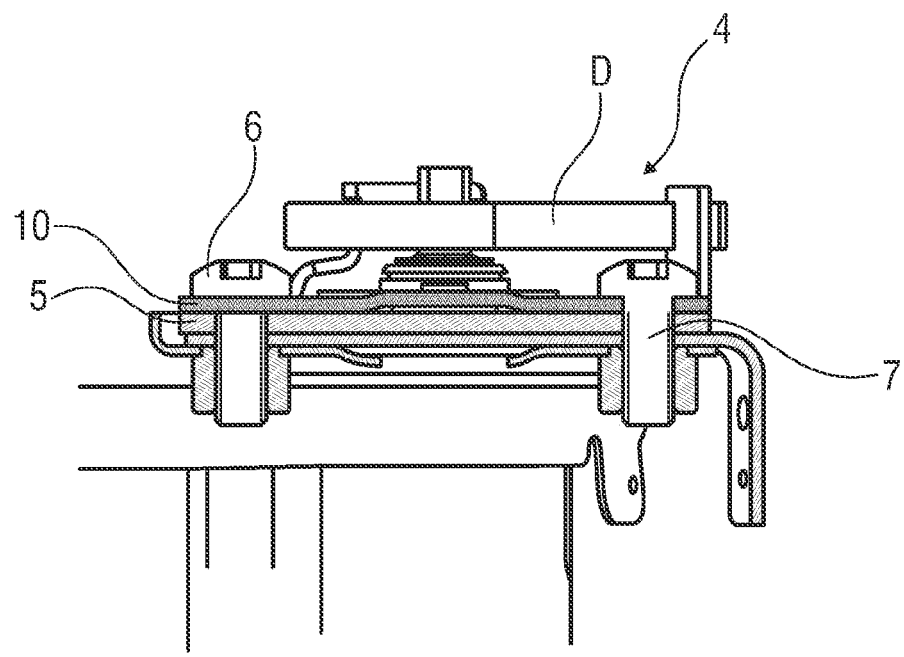
FIG. 5 shows schematically a sectional view of a second embodiment of the adjustment mechanism 4 according to FIG. 2 along the line III.
Figure 6:
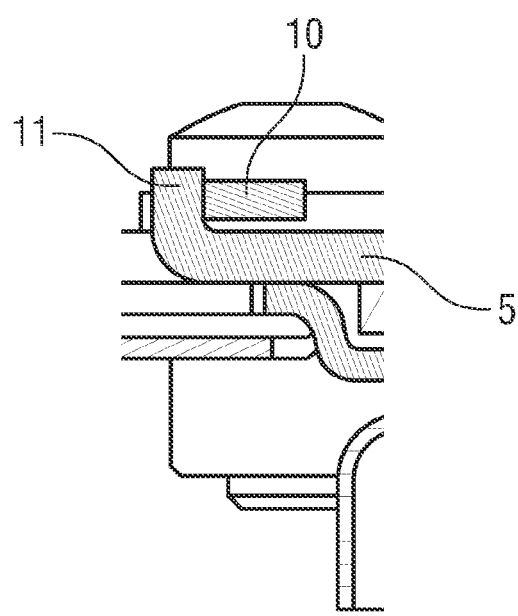
FIG. 6 shows schematically a sectional view of the second embodiment of the adjustment mechanism 4 according to FIG. 2 along the line IV.
Figure 7:
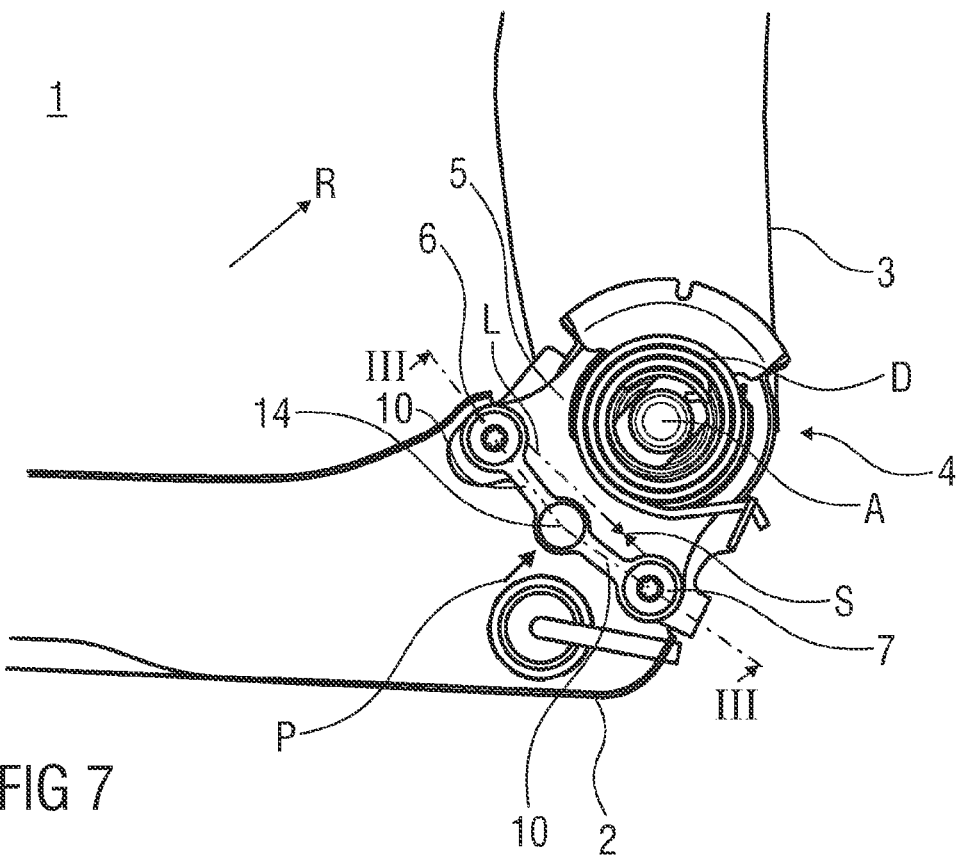

FIG. 7 shows schematically the vehicle seat according to FIG. 1 with a third embodiment of the adjustment mechanism 4 with two link plates 10 arranged in the region of the adjustment mechanism 4.

Figure 8:
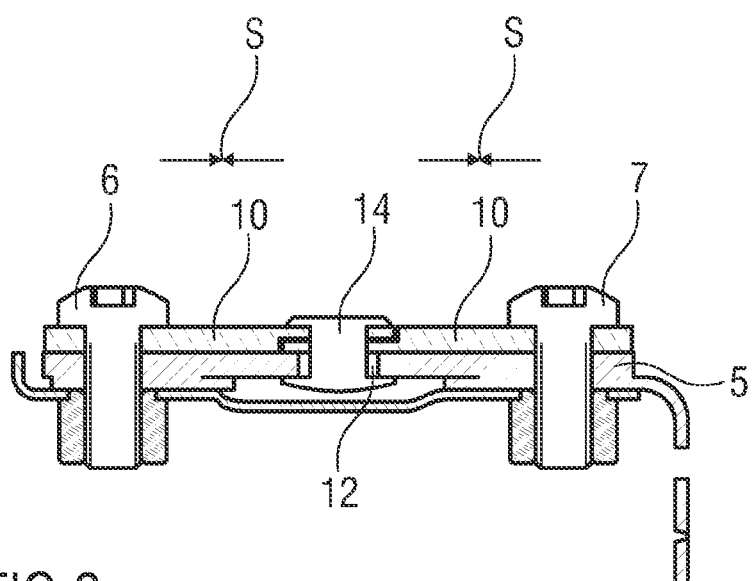

FIG. 8 shows schematically a sectional view of the third embodiment of the adjustment mechanism 4 with the two link plates 10 according to FIG. 7 along the line III.

The third embodiment coincides in the majority of features with the embodiments shown in FIGS. 1 to 6.

In the third embodiment, for displacing the backrest 3 a conventional handwheel or lever, not shown in more detail, may be provided.

The base plate 5 comprises at least one first slot 8 which permits a rotation of the backrest 3 caused by a rear impact. The first slot 8 in this case forms the through-bore for receiving a fastening means 6, in particular the front fastening means viewed in the direction of travel.

The first slot 8 is designed to be linear and extends perpendicular to the direction of travel from bottom to top. Alternatively, the slot 8 may be designed to be arcuate, as a circular segment. The front fastening means 6 is inserted into the first slot 8 and fastened there such that it strikes against one of the stop ends 9.1, in particular the rear upper stop end 9.1 of the first slot 8 viewed in the direction of travel.

In the event of an impact to the rear of the vehicle, as a result of the inertia of a vehicle occupant sitting on the vehicle seat 1, the first slot 8 permits the backrest 3 to be adjusted to a limited extent in the direction of the arrow R counter to the direction of the impact force acting on the vehicle. The adjustment movement in this case is established by the length of the first slot 8. With an arcuate slot, the pivoting movement substantially corresponds to the angle of rotation of the arcuate slot.

In the event of a rear impact, the front fastening means 6 strikes against the front lower stop end 9.2 of the first slot 8, so that the movement of the backrest 3 is limited.

By such a limited adjustment movement of the backrest 3 in the direction of the arrow R counter to the direction of the impact force acting on the vehicle, a defined adjustment of the backrest 3 is permitted, at least one portion of the energy caused by the rear impact being able to be absorbed in the path thereof.

To this end, two link plates 10 are provided as an energy-absorption arrangement. FIG. 8 shows the adjustment mechanism 4 according to FIG. 7, with two such link plates 10. The link plates 10 are fastened at their opposing ends in each case by means of the fastening means 6 and 7 to the base plate 5 and connect the two fastening means 6 and 7. The other ends of the link plates 10 are arranged on top of one another centrally between the fastening means 6 and 7, and are fastened to the base plate 5 by means of a fastening pin 14.

In the event of an impact, the link plates 10 serve for the plastic deformation, in particular by buckling and thus energy absorption. By absorbing the energy generated during the impact, the speed of impact to the rear of the head may also be reduced by plastic deformation.

To this end, the base plate 5 in the detail is provided with a second slot 12, in which the fastening pin 14 is retained. As shown in FIG. 8, the second slot 12 is of linear configuration and extends substantially parallel to the direction of travel. The second slot 12 is incorporated centrally in the base plate 5 as a through-bore. The two link plates 10 have on their free ends passage openings which are arranged on top of one another on the second slot 12, so that the fastening pin 14 is able to engage in the second slot 12 via the passage openings of the two link plates 10.

In the case of a rear impact and due to the resulting limited movement of the base plate 5 along the first slot 8, the fastening pin 14 presses against the free ends of the two link plates 10 as shown by the acting force path P, and entrains said link plates along the plate plane of the base plate 5 and perpendicular to the direction of travel such that the link plates 10 are plastically deformed, in particular buckled, as shown with reference to the buckling direction S.

In this case, the link plates 10 are moved as far as the dead center line L, and at the same time buckled in the buckling direction S, whereby the backrest 3 is adjusted in a damped manner and strikes the stop end 9.2 of the first slot 8.

In the event of a rear impact, the link plates 10 accordingly serve for the plastic deformation and thus the energy absorption. In this case, during the deflection of the backrest 3 as a result of a rear impact on the vehicle, the link plates 10 are entrained in the same direction as the deflection of the backrest 3 in the direction of the arrow R. In this case, the two link plates 10 are buckled and deformed. In particular, the two link plates 10 are deformed until said link plates have reached the predetermined dead center line L, wherein the backrest 3 is pivoted further until the fastening means 6 abut against the stop end 9.1 of the first slot 8.

By absorbing the energy produced during the rear impact by plastic deformation during a defined adjustment movement of the backrest 3, the speed of impact to the rear of the head is reduced and may counteract a whiplash injury.

Figure 9:
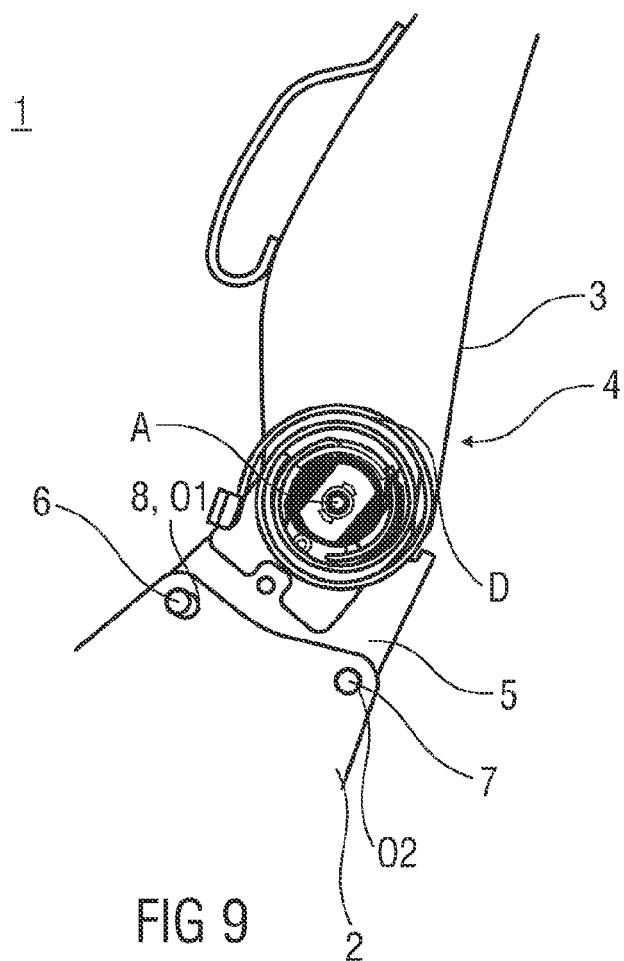

FIG. 9 shows schematically a vehicle seat 1 with a fourth embodiment of an adjustment mechanism 4 and a fastening for said adjustment mechanism 4.

The adjustment mechanism 4 comprises a base plate 5 to which the torsion spring D is fastened. The base plate 5 is fastened by means of at least one pair of fastening means 6 and 7, for example screws, to the seat part 2.

For receiving the fastening means 6, 7, the base plate 5 comprises two passage openings O1, O2 of which a first passage opening O1 is designed as a slot 8. The passage openings O1, O2 are arranged adjacent to one another in an approximately horizontal plane.

The slot 8 extends in this case in the horizontal plane and thus in a plane with the two passage openings O1 and O2. The vertical extent of the slot 8, i.e. the height thereof, corresponds to the diameter of the fastening means 6 and is thus designed to fit precisely, in particular to be only slightly larger than, the diameter of the fastening means 6.

The second passage opening O2 is of circular configuration and has a diameter which corresponds to the diameter of the fastening means 7. The second passage opening O2 is thus designed to fit precisely and to be only slightly larger than the diameter of the fastening means 7.

In other words, the at least two passage openings O1, O2 in the base plate 5 are configured with the first passage opening O1 formed as a slot 8, such that tolerances are compensated to a greater extent in the approximately horizontal plane than in the vertical plane.

As an alternative to the configuration of the first passage opening O1 as a slot 8 in the base plate 5, a third passage opening O3 of the seat part 2 corresponding to the first passage opening O1 may be configured as a slot (not shown).

In a development, either the first passage opening O1 of the base plate 5 or the third passage opening O3 of the seat part 2 corresponding thereto, is provided with a thread for receiving the fastening means 6, a screw. The slot 8 is preferably formed in the passage opening O1 or O3, which is designed to be without a thread.

The length of the slot 8 in this case predetermines the degree of compensation of tolerances, in particular the component tolerances. The height of the slot 8 and thus the extent thereof in the vertical direction in this case corresponds substantially to the predetermined nominal size of the fastening means 6 engaging therein.

By implementing such a slot 8, either in the base plate 5 or in the seat part 2, with a greater compensation of tolerances in the horizontal plane than in the vertical plane, undesirable rotation of the backrest 3 around the pivot axis A is substantially avoided.

In the event of an impact on the rear of the vehicle, as a result of the inertia of a vehicle occupant sitting on the vehicle seat 1, the slot 8 permits the backrest 3 to be able to be deflected, in particular only slightly or not at all, to a limited extent in the vertical direction and thus in the direction of action or deflection, as a result of the accurately fitting design of the first passage opening O1.

Figure 10:
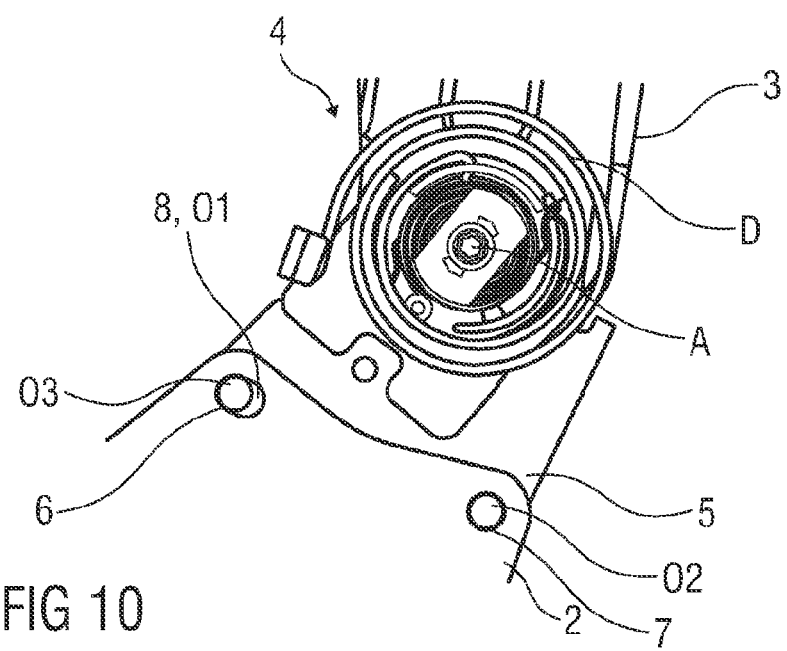

FIG. 10 schematically shows an enlarged detail of the vehicle seat 1 according to FIG. 9 in the region of the fastening with a slot 8 in the base plate 5 for compensating for component tolerances.

Figure 11:
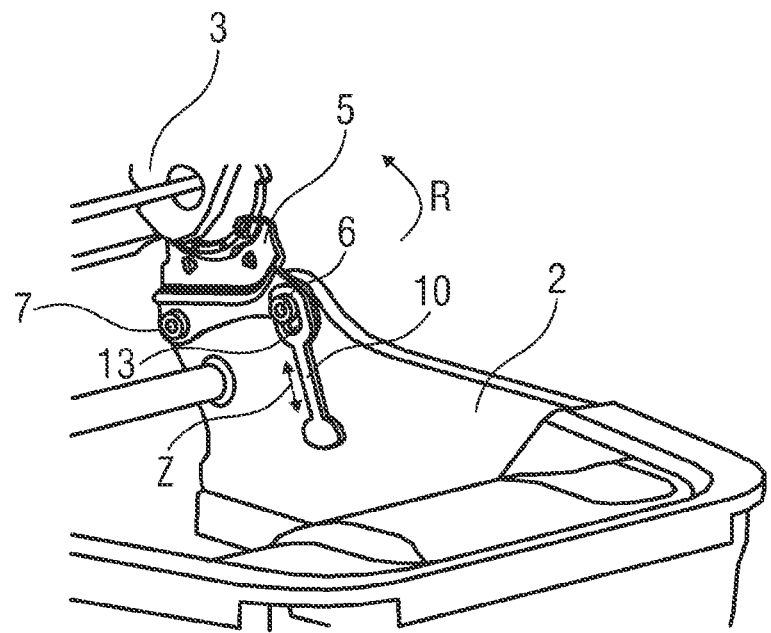

FIG. 11 shows a perspective view of an enlarged detail of the vehicle seat 1 with a fifth embodiment of the adjustment mechanism 4 and a fastening for said adjustment mechanism 4.

The adjustment mechanism 4 comprises a base plate 5. The base plate 5 is fastened to the seat part 2 by means of at least one pair of fastening means 6 and 7, for example screws.

Figure 12:
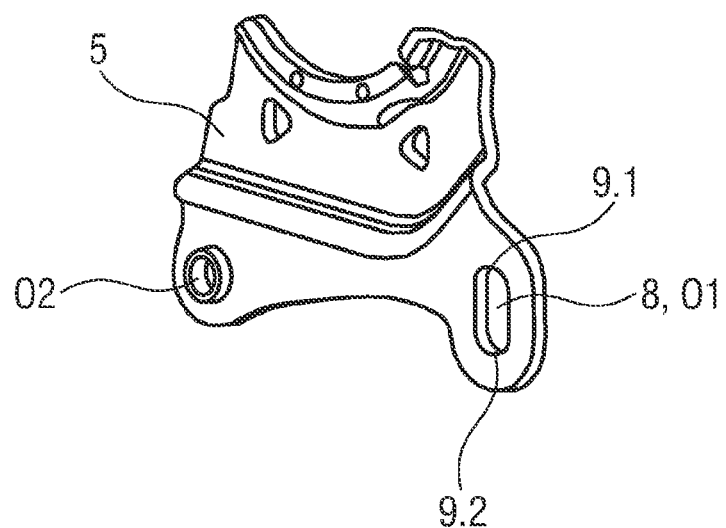

For receiving the fastening means 6, 7, the base plate 5 comprises two passage openings O1, O2, of which a first passage opening O1 is designed as a slot 8. The passage openings O1, O2 are arranged adjacent to one another in an approximately horizontal plane. FIG. 12 shows a perspective view of the base plate 5.

The slot 8 extends in this case in the vertical plane. The horizontal extent of the slot 8, i.e. its width, corresponds to the diameter of the fastening means 6 and is thus designed to fit precisely, in particular to be only slightly larger than, the diameter of the fastening means 6.

The second passage opening O2 is of circular configuration and has a diameter which corresponds to the diameter of the fastening means 7. The second passage opening O2 is thus designed to fit precisely and to be only slightly larger than the diameter of the fastening means 7.

In other words, the at least two passage openings O1, O2 in the base plate 5, with the first passage opening O1 configured as a slot 8, are configured such that a deflection of the backrest 3 is possible counter to the direction of travel, i.e. to the rear after an impact to the head.

As an alternative to designing the first passage opening O1 as a slot 8 in the base plate 5, a third passage opening O3 of the seat part 2 corresponding to the first passage opening O1 may be designed as a slot (not shown).

In a development, either the first passage opening O1 of the base plate 5 or the third passage opening O3 of the seat part 2 corresponding thereto, is provided with a thread for receiving the fastening means 6, a screw. The slot 8 is preferably configured in the passage opening O1 or O3, which is designed to be without a thread.

A link plate 10 is also provided, said link plate being fastened, in particular being screwed, to the seat part 2 at a first end by means of the front fastening means 6 together with the passage opening O1 of the base plate 5.

A second end of the link plate 10 is aligned in approximately the vertical direction and connected, for example welded or screwed onto the seat part 2 or positively suspended therein. In the case of a rear impact and the resulting deflection of the backrest 3, the link plate 10 is subjected to a pulling force counter to the direction of travel in a rotational direction denoted by the arrow R and is plastically deformed by expansion in a pulling direction Z, so that it absorbs at least a portion of the impact energy.

The first end of the link plate 10 may have a third slot 13 for receiving the fastening means 6.

The torsion spring D described in the adjustment mechanism 4 is a non-limiting example of an adjustment means. Other adjustment means, for example an electric motor, may be equally provided.

The invention claimed is:

1. A vehicle seat comprising a seat part and a backrest, wherein the seat part and the backrest are adjustable relative to one another by an adjustment mechanism, wherein a base plate receiving the adjustment mechanism is provided, wherein the base plate has at least two passage openings through which the base plate is connected to the seat part by fasteners, wherein one of the passage openings is configured as a slot, a link plate at a first end is fastened to the seat part by a front fastener, a second end of the link plate is aligned in an approximately vertical direction and is connected to the seat part, and the link plate is configured to be plastically deformed in a pulling direction in the event of a rear impact as a result of a limited adjustment movement such that a length of the link plate between the first end and the second end is extended.

2. The vehicle seat as claimed in claim 1, wherein the second end of the link plate is welded or screwed to the seat part or positively suspended therein.

3. The vehicle seat as claimed in claim 1, wherein the first end of the link plate has a third slot for receiving the front fastener.

4. The vehicle seat as claimed in claim 1, wherein the fasteners comprise screws.

5. The vehicle seat as claimed in claim 1, wherein the passage openings are arranged adjacent to one another in an approximately horizontal plane, wherein the slot extends perpendicular to a direction of travel from top to bottom or in an arcuate manner, such that the limited adjustment movement of the backrest is possible in the event of the rear impact.

6. The vehicle seat as claimed in claim 5, wherein the slot forms a through-bore of the front fastener viewed in the direction of travel.

* * * * *